United States Patent [19]

Higgins et al.

[11] 4,234,318

[45] Nov. 18, 1980

[54] PROCESS FOR GRANULATION OF SULFUR

[75] Inventors: John T. Higgins, Trail; Gordon C. Hildred, Calgary, both of Canada

[73] Assignee: Cominco Ltd., Vancouver, Canada

[21] Appl. No.: 875,369

[22] Filed: Feb. 6, 1978

[30] Foreign Application Priority Data

Feb. 4, 1977 [GB] United Kingdom .............. 04566/77

[51] Int. Cl.$^3$ .......................... B01J 2/12; B01J 2/16; B05D 1/02

[52] U.S. Cl. ................................ 23/293 S; 23/293 A; 427/213; 427/215; 427/422; 427/424; 427/427; 427/398.5

[58] Field of Search ............. 23/293 S, 293 A, 313 R, 23/313 FB; 423/567, 578 R, 578 A; 427/213, 215, 398 D, 422, 424, 427

[56] References Cited

U.S. PATENT DOCUMENTS

| | | | |
|---|---|---|---|
| 2,629,133 | 2/1953 | Morningstar et al. | 23/293 S |
| 3,142,862 | 8/1964 | Guldman | 23/313 R |
| 3,231,413 | 1/1966 | Berquin | 23/313 FB |
| 3,634,046 | 1/1972 | Allen | 23/293 S |
| 3,936,534 | 2/1976 | Schallis | 427/215 |
| 3,991,225 | 11/1976 | Blovin | 427/215 |

*Primary Examiner*—Bradley R. Garris
*Attorney, Agent, or Firm*—Arne I. Fors; Robert F. Delbridge

[57] ABSTRACT

A process for the production of granular sulfur in a rotating drum in which molten sulfur at a temperature within the range of about 110° to 160° C. is sprayed in a contact zone onto a bed of moving sulfur particles and a continuous curtain of said particles and resulting particles are passed to a cooling zone prior to discharge. A countercurrent flow of substantially inert cooling gas at a temperature in the range of about 10° to 50° C. and containing not more than 8% by volume oxygen is introduced to the cooling zone and a portion or all of said cooling gas is passed through the contact zone. The contact and cooling zones can be formed in a single rotating drum and separated from each other by a retaining ring or formed in separate vessels.

Discharge particles from the cooling zone are separated according to size and undersized particles are recycled as fines to the contact zone at a ratio of 4:1 to 2:1 of fines to product granules.

4 Claims, 2 Drawing Figures

PROCESS FOR GRANULATION OF SULFUR

BACKGROUND OF THE INVENTION

This invention relates to a process for the production of sulfur in granular form and, more particularly, relates to a process for the granulation of sulfur in a rotating drum.

Sulfur is recovered in large quantities from sulfur deposits and natural gas, and is usually stored in solid form in impounded areas at plant sites until it can be processed in suitable form for the market. Suitable forms of elemental sulfur may be slab sulfur or particulate sulfur in the form of prills, pellets, granules or flakes.

The prior art discloses a number of processes for the production of particulate sulfur. In one type of process, sulfur may be melted and the molten sulfur dispersed, or dropped in globular form, into a cooling medium such as a gas or liquid, whereby the molten sulfur solidifies in the form of solid globules or prills. Alternatively, molten sulfur may be solidified in a layer which may be flaked or crushed to produce particulate sulfur. Another process for producing a particulate sulfur is by compaction of finely divided solid sulfur in the presence of a binder. Still other processes involve the prilling or pelletization of liquid sulfur in a fluidized or spouted bed. The prior art also discloses the granulation of sulfur together with amounts of added compounds in a pan or a blender.

The above mentioned processes for the production of particulate elemental sulfur have a number of important disadvantages. The two most important disadvantages are the presence of sulfur dust often inherent in the process of production or resulting from the attrition of particulate sulfur products upon handling and the fire and explosion hazards presented by the sulfur dust. Other disadvantages of the prior art processes reside in the necessity of removing adhering liquid from sulfur produced in processes using a liquid as a cooling medium for molten sulfur and, in other processes, removing added compounds or binders which interfere with the end-use of elemental sulfur. Non-uniformity of the size and shape of particulate sulfur is a common occurrence in many processes.

We have found that the disadvantages of the known processes for the manufacture of particulate sulfur can be avoided or greatly alleviated. Thus, we have found that particulate sulfur can be produced in a process wherein the explosion hazard is substantially avoided and the particulate sulfur is substantially pure, resistant to attrition, hard, and uniformly and closely sized.

STATEMENT OF INVENTION

We have found that the disadvantages of the known processes can be alleviated when a heated melt of sulfur is sprayed onto a bed of moving solid particles of sulfur and into continuously cascading solid sulfur particles while simultaneously contacting the particles with a current of substantially inert cooling gas.

The process of the present invention comprises, in general, the steps of forming and maintaining in a rotating horizontally elongated contact zone a bed of moving solid particles of sulfur; adding finely divided solid particles of sulfur to said bed; advancing said particles through said contact zone; continuously raising solid particles from said bed to the upper region of said contact zone; releasing the raised solid particles and allowing said raised particles to cascade downwardly through said contact zone onto the bed as a continuous curtain of solid sulfur particles extending substantially the length of said contact zone; spraying molten sulfur at a temperature within the range of about 110° to about 160° C. onto said bed and into the curtain of solid particles cascading downwardly through said contact zone onto said bed; passing said particles to a cooling zone; continuously passing a current of substantially inert cooling gas through said cooling zone and said contact zone countercurrent to the direction of advance of said particles; discharging sulfur granules from said cooling zone; and separating solid particles within a predetermined size range from said discharged sulfur granules from said cooling zone.

More particularly, the process of the invention contemplates spraying the molten sulfur at a temperature within the range of about 10 to about 40 Celsius degrees above the sulfur melting temperature onto the cascading bed and introducing the substantially inert cooling gas at a temperature within the range of about 10° to about 50° C. to the cooling zone.

BRIEF DESCRIPTION OF THE DRAWINGS

The process will now be described in detail with reference to the accompanying drawings in which.

DESCRIPTION OF THE PREFERRED EMBODIMENTS

Figure 1:
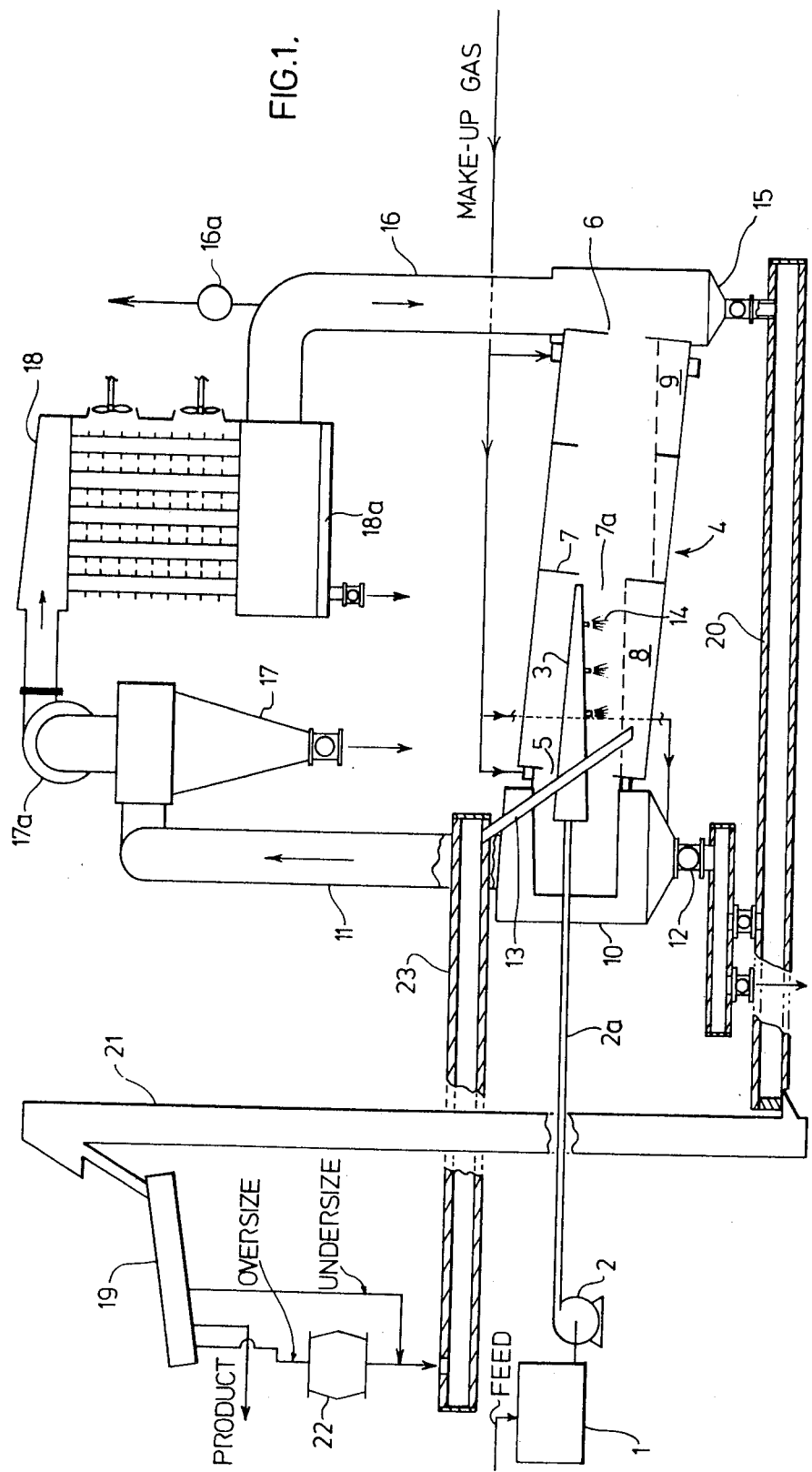
FIG. 1 is a schematic illustration of a system for the production of granulated sulfur in which the process of this invention is incorporated.

Referring to FIG. 1 of the drawings, elemental sulfur feed to the process is fed to sulfur holding vessel 1 which contains molten sulfur which may either originate as molten sulfur from an elemental sulfur producing process or may be melted from solid sulfur added to the vessel. Holding vessel 1 is provided with heating means (not shown) to maintain molten sulfur in the liquid state or to melt solid sulfur. Process fines, which may be collected from one or more points in the process of the invention, may be added to the holding vessel 1 for melting and recycling. Alternatively, these process fines may be separately melted and the molten sulfur added to vessel 1. The molten sulfur in vessel 1 may be further heated to a temperature which enables the formation of desired sulfur granules in the granulator, to be described. This temperature may be in the range of about 119° to 159° C. and most preferably in the range of about 130° to 158° C.

Elemental sulfur has a melting temperature range of from about 110° to 119° C., the exact melting temperature depending on the allotropic form of the solid sulfur. The term "melting temperature" referred to herein thus will be understood to mean the melting temperature of sulfur within the range of 110° to 119° C. depending on the crystalline form of the sulfur at the time of melting.

Molten sulfur has a viscosity profile which decreases gradually from its melting temperature as the temperature increases and reaches a minimum at a temperature in the range of about 157° to 160° C. from which temperature range the viscosity increases almost asymptotically. The most preferred temperature range of about 130° to 158° C. includes the point of minimum viscosity at its upper limit, while its lower limit allows the transfer of molten sulfur at a sufficiently low operable viscosity as well as its application in the granulation process.

Molten sulfur is pumped from vessel 1 by pump 2 at the desired rate and temperature to spray header 3 positioned in granulator 4. Granulator 4 is preferably an elongated drum mounted for rotation about its longitudinal axis, which is slightly inclined to the horizontal. The drum has a feed inlet opening 5 and a discharge opening 6. The drum is supported on rollers and can be rotated at a predetermined speed. An upstanding retaining ring 7 divides the drum transversely into a contact zone or granulating chamber 8 and a cooling zone or cooling chamber 9, and defines a central opening 7a between chamber 8 and chamber 9. In most cases, cooling chamber 9 is longer than granulating chamber 8. The inside wall of the granulator is equipped with lifting elements (not shown), which are uniformly and circumferentially spaced and substantially extend the length of the granulator.

Feed inlet opening 5 is enclosed by a breech 10 which has an exhaust duct 11 and a discharge opening 12. A feed inlet conduit 13 extending into granulator 4 passes through breech 10 and feed inlet opening 5. Breech 10 is designed to separate at least a portion of solids which may be entrained in exhaust cooling gas passing through granulator 4 and into the breech. Breech 10 may, therefore, have a design similar to a cyclone separator or any other effective configuration.

Spray header 3 extends through breech 10 and feed inlet opening 5 into granulating chamber 8 and provides that the temperature and distribution of spray issuing from the header can be maintained within narrow limits, local hot or cold spots are avoided and the spray rate can be closely controlled. Spray heads with spray nozzles 14 attached to spray header 3 are connected with pump 2 via a transfer line 2a. The spray heads with spray nozzles and transfer lines are all insulated and steam-traced to avoid solidification of molten sulfur and to maintain the desired spraying temperature.

Recycle fines of sulfur are fed from feed inlet conduit 13 into the contact zone or granulating chamber 8 of rotating granulator 4 wherein the fines form a continuously moving bed and a continuously cascading curtain of solid sulfur particles. Molten sulfur issuing from spray nozzles 14 in a dispersed pattern of molten sulfur droplets is sprayed onto the bed and into the curtain of solid particles and continuously wets and coats the sulfur particles causing an increase in the size of these particles. The contacting and rolling action of the sulfur particles in the moving bed enhances the uniform distribution of the liquid coating on the particles.

Molten sulfur should be sprayed from spray nozzles 14 at a temperature at least above the solidifcation temperature of molten sulfur and at a spray pressure in the range of 100 to 400 kPa. As discussed above, the temperature of molten sulfur is preferably in the range of about 119° to 159° C. and most preferably in the range of about 130° to 158° C., i.e. about 10 to about 40 Celsius degrees above the sulfur melting temperature. The particles continuously advance through granulating chamber 8 as a continuously moving bed and cascading curtain, pass through the central opening 7a in retaining ring 7 into cooling zone or cooling chamber 9, continuously advance through cooling chamber 9 and discharge from granulator 4 through discharge opening 6 into hopper bottom 15 of duct 16.

The particulate sulfur is contacted with substantially inert cooling gas which flows countercurrent to the direction of the advance of the particles through granulator 4. Substantially inert cooling gas is defined as gas which contains an amount of oxygen that is less than that which may cause explosion in a sulfur containing atmosphere. The upper allowable limit of the oxygen content of the gas to ensure safe operation is generally considered to be about 8% by volume. Substantially inert cooling gases which may be safely used alone or in combination in the process are, for example, carbon dioxide or nitrogen, carbon dioxide or nitrogen containing not more than 8% by volume oxygen, and carbon dioxide or nitrogen containing not more than 38% by volume air. It is understood that other substantially inert gases alone or in combination may be used as long as those gases contain not more than 8% oxygen by volume.

The cooling gas enters granulator 4 through discharge opening 6 from a duct 16, which surrounds opening 6, passes through cooling chamber 9, granulating chamber 8, and through feed inlet opening 5 into breech 10 wherein at least a portion of solids entrained in the cooling gas is separated therefrom. These separated solids are discharged from breech 10 through discharge opening 12 while the cooling gas discharges from breech 10 through exhaust duct 11. Fines entrained in the gas flowing through duct 11 are separated therefrom in cyclone separator 17 and collected fines discharged from separator 17 may be returned to granulating chamber 8, or, alternatively to vessel 1.

The cooling gas is circulated back to the granulator by circulating means 17a, such as, for example, a fan or blower. The gas passes through exhaust duct 11, cyclone separator 17, circulating means 17a, gas cooler 18 and duct 16.

Gas cooler 18 is of suitable design using air, water, or both as cooling medium to cool the cooling gas to the temperature desired to effect the necessary cooling of sulfur particles in granulator 4. For example, gas cooler 18 may be a forced-air cooler using ambient air or air that is pre-cooled. Sulfur particles entrained in recirculated cooling gas may collect in the bottom 18a of gas cooler 18. Collected particles may be removed from the gas cooler and fed to holding tank 1 for remelting. If desired, one or more optional gas cooling means may be provided in addition to gas cooler 18. Such additional cooling means may conveniently be located in exhaust duct 11 or in duct 16 and may use air, ambient or pre-cooled, or water as a cooling medium.

The temperature of the cooling gas entering the granulator must be well below the temperature of molten sulfur and sulfur particles in the granulator and is preferably close to ambient temperature, i.e. the temperature of the atmosphere surrounding the process equipment. Temperatures in the range of about 10° to about 50° C. are preferred. Thus, before entering the granulator, the re-circulated cooling gas is cooled to a temperature in this preferred range. When passing through the granulator, the temperature of the cooling gas increases as a result of heat exchange with sulfur particles in the granulator, particularly those forming the curtain of cascading particles, and with sprays of molten sulfur issuing from the spray header.

The flow rate of cooling gas through the granulator can be controlled and is regulated to provide the cooling effect necessary to solidify the wet coatings on the sulfur particles in the granulator in time to avoid agglomeration of particles after uniform distribution of molten sulfur on the particles has been accomplished. The rate of cooling of the wetted sulfur particles should also be controlled to avoid the formation of sulfur in amorphous form, which is often "sticky". Thus, it is important that the freshly solidified sulfur, that forms part of the sulfur granules, passes through the amorphous form into the monoclinic form without causing agglomeration of granules. Changing from the monoclinic into the rhombic form occurs over a period of time during and after cooling. This change does not affect the quality of the granules.

The particles of sulfur which discharge from granulator 4 into hopper bottom 15 of duct 16 are transferred to conventional screen unit 19 by the use of conventional transfer means such as conveyor belts, augers, elevators and the like. In this embodiment of the process the transfer means consist of belt conveyor 20 and elevator 21. The sulfur particles separated in breech 10 and discharged through discharge opening 12 may also be transferred via belt conveyor 20 and elevator 21 to screen unit 19. Alternatively, all or a portion of the separated, discharged sulfur particles from discharge opening 12 may be fed to sulfur holding vessel 1 or, if desired, to a separate melter (not shown) before being fed to vessel 1. The discharge of sulfur particles from breech discharge opening 12, hopper bottom 15, cyclone separator 17 and gas cooler 18a is preferably accomplished by means of rotary valves.

The particles of sulfur are separated in screen unit 19 into a product-size fraction, an oversize fraction and an undersize fraction. The size fraction in a particle size range of −6 to +14 mesh, preferably −6 to +10 mesh (Tyler Screen series) is withdrawn as product. The oversize fraction is reduced in size in crusher 22 and this crushed fraction together with the undersize fraction are returned by transfer means 23 and inlet conduit 13 as recycle fines to granulating chamber 8. The ratio of recycle fines to product sulfur is usually maintained in the range of 4:1 to 2:1.

If desired, or if necessary, sulfur particles discharged from granulator 4 may be passed to a supplementary cooler, not shown, wherein the particles are further cooled with substantially inert cooling gas prior to being separated in fractions in screen unit 19. Alternatively, further cooling, if desired, may be accomplished by passing only the product-size fraction of the particles of sulfur through a supplementary cooler after the particles of sulfur have been screened in unit 19 into size fractions.

To reduce the hazard of explosion to a minimum, a substantially inert atmosphere should be maintained in all process equipment. Thus all equipment used in the process, including granulator, breech, holding vessel, transfer means, screen unit, crusher, gas cooler, supplementary coolers and other ancillary equipment such as pipes, ducts and pumps and the like, should form a substantially integrated and closed gas system from which non-substantially inert gases are excluded. The substantially closed system is preferably maintained under a slight overpressure of substantially inert gas to prevent an oxygen-containing gas such as air from entering the system. Any loss of substantially inert gas from the system may be made up by feeding additional substantially inert gas at one or more points in the closed system. Additional substantially inert gas is preferably fed to the system at the granulator seals, i.e. at the points where the breech 10 encloses the feed inlet opening 5 of granulator 4 and where duct 16 encloses discharge opening 6 of granulator 4. A flow of substantially inert gas may also be added to the bottom of breech 10 in which it may aid the separation of solids from the cooling gas. A gas purge may be provided at one or more points in the process. One such point is indicated at 16a.

The cooling chamber 9 generally is longer and thus larger than granulating chamber 8 of graulator 4 and, if desired, an additional cooler vessel or vessels may be used to cool the sulfur particles discharged from the granulator. It is inherent in the process according to FIG. 1 that all cooling gas entering the cooling chamber also passes through the granulating chamber, while additional cooling gas must be supplied and circulated for any supplementary coolers. However, by proper choice of the dimensions of the granulating chamber and the cooling chamber, and by incorporating the chambers in separate vessels, the total demand for cooling gas can be reduced to advantage while necessary or desired supplementary cooling capacity is eliminated or reduced. Other advantages are the possibilities of reducing the velocity of and additionally cooling the portion of the cooling gas flowing through the granulating chamber. The portion of the cooling gas circulated through the granulation vessel is determined by operating conditions and dimensions of the vessels.

Figure 2:
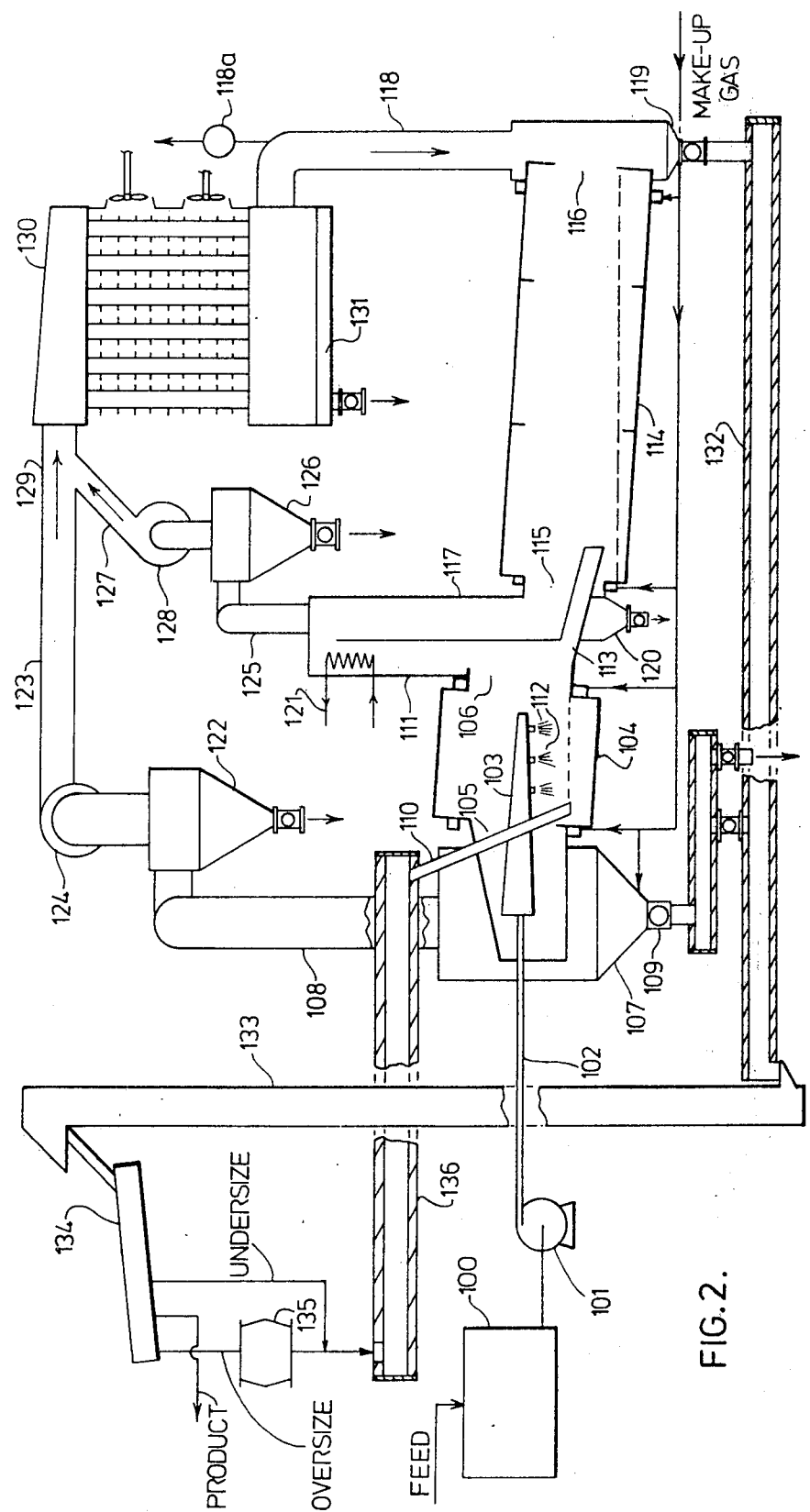
FIG. 2 is a schematic illustration of another embodiment of the system incorporating the process of the invention.

Referring now to FIG. 2 of the drawings, although the apparatus of the process and process flowsheet represented schematically is in most respects the same as that illustrated in FIG. 1, the main differences are the separation of contact zone and cooling zone whereby a granulating chamber and a cooling chamber are accommodated in separate vessels and the use of an integrated and closed gas system for substantially inert cooling gas whereby all of the cooling gas is circulated through the cooler vessel and a portion thereof is circulated through the granulator vessel.

Elemental sulfur introduced to the process is fed to sulfur holding vessel 100 in solid or molten form. Vessel 100 is supplied with heating means to melt solid sulfur or to raise the temperature of molten sulfur. The temperature of the sulfur in vessel 100 is maintained at or raised to a temperature in the range of about 110° to 160° C., preferably 130° to 158° C., i.e. about 10 to about 40 Celsius degrees above the sulfur melting temperature, in which ranges the sulfur is in the liquid state. Process fines collected from one or more points in the process may also be fed to vessel 100 either in solid or molten form.

Molten sulfur is pumped from vessel 100 by pump 101 through line 102 to spray header 103 positioned in granulator 104.

Granulator 104, preferably an elongated drum mounted for rotation about its horizontal axis, which is slightly inclined to the horizontal, has a feed inlet opening 105 and a discharge opening 106. Granulator 104 is supported on rollers and can be rotated at a predetermined speed. The inside wall is equipped with lifting elements which are uniformly and circumferentially spaced and extend substantially the length of the vessel. Feed inlet opening 105 is enclosed by a breech 107, which has an exhaust duct 108 and a bottom discharge 109. A feed inlet conduit 110 passes through breech 107 and inlet opening 105. Breech 107 is of similar design and has the same function as the breech described above with reference to FIG. 1. Discharge opening 106 is enclosed by duct 111, to be described.

Spray header 103, of similar design and of the same function as the spray header described above with reference to FIG. 1, is equipped with spray heads and spray nozzles 112. Spray heads and spray nozzles 112, and all lines and pumps, etc. containing molten sulfur, are insulated and steam-traced to prevent solidification of molten sulfur and to maintain the desired spraying temperature.

Recycle fines of sulfur, at a ratio of recycle fines to product sulfur in the range of 4:1 to 2:1, are supplied through feed inlet conduit 110 into granulator 104 wherein they form a continuously moving bed and a continuously cascading curtain of solid sulfur particles. Molten sulfur issuing from nozzles 112 in a pattern of dispersed molten sulfur droplets continuously wets and coats the sulfur particles causing an increase in size of the particles. The process proceeds similarly to that as described above with reference to FIG. 1 and the particles continuously advance through granulator 104 and discharge through connecting chute 113 into separate cooler 114.

Cooler 114 illustrated has an inlet opening 115 and a discharge opening 116 and is preferably an elongated drum mounted for rotation about its longitudinal axis, which is slightly inclined to the horizontal. Cooler 114 is supported on rollers and can be rotated at a predetermined speed. The inside wall is equipped with lifting elements which are uniformly and circumferentially spaced and extend substantially the length of the vessel. Cooler 114 could comprise a vessel for fluidizing or spouting a bed of granules with a flow of substantially inert cooling gas. Although such alternative coolers can be successfully used, cooling gas losses are usually greater and auxiliary equipment required for cleaning off-gases are more complex than for a rotary drum-type cooler.

Inlet opening 115 is enclosed by duct 117 and discharge opening 116 is enclosed by duct 118. Chute 113 which interconnects granulator 104 and cooler 114 extends from discharge opening 106 through enclosing duct 111 of the granulator and through inlet opening 115 and enclosing duct 117 into the cooler. Ducts 108, 111, 117 and 118 form a part of the cooling gas system, to be described.

The sulfur particles entering cooler 114 through chute 113 form a continuously advancing bed of particles and a continuously cascading curtain of particles. The sulfur particles are discharged through discharge opening 116 into duct 118 and collect in hopper portions 119 from which they are, in turn, discharged to transfer means, to be described.

The granular particles advancing through granulator 104 and cooler 114 are contacted with a countercurrent flow of substantially inert cooling gas in a cooling gas system. In this system the cooling gas enters cooler 114 through discharge opening 116 from duct 118, passes through cooler 114 and leaves the cooler through inlet opening 115 into duct 117. Entrained fines that may settle out of the gas flow in duct 117 collect in lower portion 120 from which they are removed and transferred to vessel 100. At least a portion of the gas flow through duct 117 passes through a gas cooler 121 wherein the gas is cooled by indirect heat exchange with, for example, water. This portion of cooled gas then passes through duct 111, enters granulator 104 through discharge opening 106, pases through granulator 104 and exits via inlet opening 105 into breech 107. At least a portion of solid particles entrained with the cooling gas settles out of the gas in breech 107 and the gas leaves the breech through duct 108. The gas subsequently passes through a cyclone separator 122 wherein entrained fines separate from the gas. Separated fines are discharged from separator 122 and may be returned to granulator 104 or fed to vessel 100, as desired. Gas from separator 122 passes through duct 123 wherein gas circulating means 124, such as a fan or a blower, is positioned.

The remaining portion of the gas flowing through duct 117 is diverted through duct 125 to cyclone separator 126 wherein entrained fines separate from the gas. Separated fines are discharged from separator 126 and may be returned to granulator 104 or fed to vessel 100, as desired. Gas from separator 126 passes through duct 127 wherein gas circulating means 128, such as a fan or a blower, is positioned. Duct 123 joins duct 127 and the combined gas flow passes through duct 129, through gas cooler 130 and into duct 118. Gas cooler 130 is similar to gas cooler 18 described with reference to FIG. 1. Fine sulfur particles, which may collect in the cooler 130, may be discharged from bottom portion 131.

The capacities of circulating means 124 and 128 and the quantities of the portions of gas flow passing through ducts 111 and 125 are chosen and balanced to provide the required cooling gas flows through the granulator 104 and the cooler 114. The temperatures of the cooling gas through the granulator and the cooler are controlled by the amount of cooling applied to the gas in gas cooler 121 and gas cooler 130, respectively.

Sulfur particles collected from lower portion 120 of duct 117, from bottom portion 131 of gas cooler 130 and, if desired, at least a portion of particles discharged from breech 107 through bottom discharge 109, may be returned to granulator 104 or may be passed to sulfur holding vessel 100, as desired. These particles may be melted before being passed to vessel 100.

The particles of sulfur which discharge from hopper portion 119 of duct 118 and from bottom discharge 109 of breech 107 are handled and processed similarly to the particles discharged from hopper bottom 15 of duct 16 with reference to FIG. 1. Briefly, the particles are transferred via means 132 and 133 to screen unit 134 for separation into size fractions, product fraction is removed, oversize fraction is crushed in crusher 135 and crushed oversize fraction is combined with undersize fraction and transferred as recycle fines by means 136 to feed inlet conduit 110.

As described with reference to FIG. 1, the equipment in the process according to FIG. 2 also forms an integrated and closed gas system from which non-substantially inert gases are excluded. Any loss of substantially inert gas from the system may be made up by feeding additional substantially inert gas, preferably at those points at which the breech and the various ducts enclose the inlet and discharge openings of the granulator and the cooler, respectively. Substantially inert gas may also be added to the bottom of the breech in which it may aid in the separation of solids from cooling gas. A gas purge may be provided at one or more points in the process. One such point is indicated at 118a.

The process of the invention will now be described with reference to the following examples.

EXAMPLE 1

The process is operated using equipment as described with reference to FIG. 1 to produce 240 metric tonnes (t) per day of granulated sulfur. 480 t/day sulfur fines are fed to a granulator having a diameter of 3.6 m containing a bed of moving solid particles of sulfur and consisting of a 6 m long granulating chamber and a 6 m long cooling chamber. The granulator is positioned under an inclination of 3 cm/m and rotated at 10 rpm. Lifting elements in the rotating granulator cause formation of a cascading curtain of sulfur particles. Molten sulfur is sprayed through spray nozzles under a pressure of 400 kPa and at a temperature of 140° C. Substantially inert cooling gas, i.e. nitrogen, is supplied to the inlet of the granulator at a rate of 23000 normal m³/h and at a temperature of 30° C. Cooling gas is also supplied at the granulator seals and at the crusher under a pressure of 20 kPa. To maintain the equipment under a slight overpressure, an amount of 2000 normal m³/h of cooling gas is supplied as make-up.

Granulated sulfur is discharged from the cooler at a temperature of 50° C. while the cooling gas attains a temperature of 90° C.

Granulated sulfur is screened to yield 240 t/day of product having particle sizes in the range of −6 to +10 mesh (Tyler Screen Series). The oversize is crushed, combined with the undersize for a total amount of 480 t/day, and recycled to the granulator at a recycle fines to sulfur product ratio of 2:1.

The cooling gas is circulated in the granulator by a fan via an air-cooled gas cooler wherein the gas is cooled from 90° C. to 30° C. The pressure at the suction side of the fan is −2 kPa and at the discharge side is 7.5 kPa.

EXAMPLE 2

The process is operated using equipment as described with reference to FIG. 2 to produce 240 t/day of granulated sulfur. 480 t/day sulfur fines are fed to a granulator having a diameter of 3.6 m, length of 6 m and containing a bed of moving solid particles of sulfur. The granulator is positioned under an inclination of 3 cm/m and is rotated at 10 rpm. Lifting elements in the rotating granular cause formation of a cascading curtain of sulfur particles. Molten sulfur is sprayed onto the solid particles of sulfur through spray nozzles under a pressure of 400 kPa and at a temperature of 140° C. Substantially inert cooling gas, i.e. nitrogen, is supplied to the inlet of the granulator at a temperature of 40° C. and at a rate of 18300 normal m³/h. Cooling gas is also supplied at the granulator and cooler seals and at the crusher under a pressure of 20 kPa. To maintain the equipment under a slight overpressure an amount of 2000 normal m³/h of cooling gas is supplied as make-up. Granulated sulfur leaves the granulator with a temperature of 90° C., while the cooling gas has attained a temperature of 90° C.

Granulated sulfur passes through the connecting chute into the cooler. The cooler is a rotary drum cooler which has a diameter of 3.6 m and is 6 m long and is rotated at 12 rpm. Similarly to the granulator, the cooler is positioned under an inclination of 3 cm/m and contains a moving bed and cascading curtain of solid sulfur particles. Granulated sulfur, which enters at 90° C., is cooled in a countercurrent flow of cooling gas and leaves the cooler at a temperature of 50° C. Cooling gas flows through the cooler at a rate of 23000 normal m³/h enters the cooler at a temperature of 30° C. and leaves at 50° C. 20% of the total volume of cooling gas (4700 m³/h) is separated and is blown, after separation of entrained sulfur particles, to the gas cooler, while the remaining 80% or 18300 normal m³/h is cooled to 40° C. by means of water-fed cooling coils and passes into the granulator. The cooling gas exiting from the granulator at a temperature of 90° C. is blown, after separation of entrained sulfur, to the gas cooler. In the gas cooler the flows of cooling gas from the granulator and the cooler are cooled to 30° C. and subsequently passed to the cooler.

Granulated sulfur from the cooler is screened giving 240 t/day of product having particle sizes in the range of −6 to +10 mesh (Tyler Screen Series). The oversize is crushed, combined with the undersize for a total amount of 480 t/day and recycled to the granulator.

It will be understood, of course, that modifications can be made in the embodiment of the invention illustrated and described herein without departing from the scope and purview of the invention as defined by the appended claims.

What I claim as new and desire to protect by Letters Patent of the United States is:

1. A process for producing granular sulfur which comprises the steps of forming and maintaining in a rotating horizontally elongated granulating vessel a bed of continuously moving solid particles of sulfur by adding finely divided solid particles of sulfur to said bed, advancing said particles through said granulating vessel, spraying molten sulfur at a spray pressure in the range of about 100 to 400 kPa and at a temperature 10° to 40° Celcius degrees above the sulfur melting temperature onto said bed and into a continuously cascading curtain of solid particles extending substantially the length of said granulating vessel, simultaneously contacting the continuously cascading curtain of particles with a current of substantially inert cooling gas flowing countercurrently to the direction of the advance of said particles, passing said particles from said granulating vessel to a rotating horizontally elongated cooling vessel, advancing said particles through said cooling vessel, forming a bed of continuously moving solid particles of sulfur and a continuously cascading curtain of solid particles in and extending substantially the length of said cooling vessel, simultaneously contacting the advancing particles in said cooling vessel with a current of substantially inert cooling gas flowing countercurrently to the direction of advance of said particles, withdrawing cooled solid particles from said cooling vessel, separating cooled solid particles within a predetermined size range from said withdrawn cooled solid particles as product granules, recycling cooled solid particles smaller than those within said predetermined size range as finely divided solid particles of sulfur to said granulating zone at ratios in the range of from 4:1 to 2:1 of finely divided particles to product granules, said withdrawing, separating and recycling being carried out in the presence of substantially inert cooling gas, said substantially inert cooling gas containing not more than 8% by volume of oxygen and being circulated by an integrated and closed gas system comprising said granulating vessel, said cooling vessel and a gas cooler, cooling said cooling gas in said gas cooler to a temperature in the range of about 10° to 50° C., introducing said cooled cooling gas into said cooling vessel, passing said cooling gas through said coolng vessel, cooling a portion of said cooling gas from said cooling vessel to a temperature in the range of about 10° to 50° C., passing said cooled portion of said cooling gas through said granulating vessel, combining the remaining portion of cooling gas from said cooling vessel with cooling gas passed through said granulating vessel and passing said combined cooling gas to said gas cooler.

2. A process for producing granular sulfur which comprises the steps of forming and maintaining a continuously moving bed and a continuously cascading curtain of solid particles of sulfur extending substantially the length of a rotating vessel having a horizontally elongated granulating zone and a cooling zone divided by an upstanding retainer ring, advancing said particles through said granulating zone, spraying molten sulfur at a spray pressure in the range of about 100 to 400 kPa and at a temperature 10 to 40 Celcius degrees above the sulfur melting temperature onto said bed and into said curtain of said solid particles in said granulating zone, simultaneously contacting said curtain with a current of substantially inert cooling gas flowing countercurrently to the direction of the advance of said particles, continuously passing said solid particles from said granulating zone to said cooling zone, advancing said solid particles through said cooling zone, simultaneously cooling the advancing particles by cooling with a current of substantially inert cooling gas flowing countercurrently to the direction of advance of said particles, withdrawing cooled solid particles from said cooling vessel, separating cooled solid particles within a predetermined size range from said withdrawn cooled solid particles as product granules, recycling cooled solid particles smaller than those within said predetermined size range as finely divided solid particles of sulfur to said granulating zone at ratios in the range of from 4:1 to 2:1 of finely divided particles to product granules, said withdrawing, separating and recycling being carried out in the presence of substantially inert cooling gas, said substantially inert cooling gas containing not more than 8% by volume of oxygen and being circulated by an integrated and closed gas system comprising a gas cooler and said rotating vessel, cooling said cooling gas in said gas cooler to a temperature in the range of about 10° to 50° C., introducing the cooled cooling gas as said current of cooling gas into said cooling zone, passing said current through said cooling zone and through said granulating zone of said rotating vessel, separating any entrained fines from cooling gas from said granulating zone and passing cooling gas to said gas cooler.

3. A process as claimed in claim 1 or 2 in which said substantially inert cooling gas is chosen from carbon dioxide, nitrogen and mixtures thereof and contains not more than 8% by volume oxygen.

4. A process as claimed in claim 1 or 2 in which said substantially inert cooling gas is chosen from carbon dioxide, nitrogen and mixtures thereof and contains not more than 38% by volume air.

* * * * *